(12) United States Patent
Chen et al.

(10) Patent No.: US 8,260,605 B2
(45) Date of Patent: Sep. 4, 2012

(54) WORD SENSE DISAMBIGUATION

(75) Inventors: Ping Chen, Houston, TX (US); Wei Ding, Dorchester, MA (US)

(73) Assignee: University of Houston System, Houston, TX (US)

( * ) Notice: Subject to any disclaimer, the term of this patent is extended or adjusted under 35 U.S.C. 154(b) by 381 days.

(21) Appl. No.: 12/633,929

(22) Filed: Dec. 9, 2009

(65) Prior Publication Data

US 2010/0153090 A1     Jun. 17, 2010

Related U.S. Application Data

(60) Provisional application No. 61/121,015, filed on Dec. 9, 2008.

(51) Int. Cl.
G06F 17/21 (2006.01)
G06F 17/27 (2006.01)

(52) U.S. Cl. 704/10; 704/9; 707/999.001; 707/999.003; 707/999.102

(58) Field of Classification Search ................. None
See application file for complete search history.

(56) References Cited

U.S. PATENT DOCUMENTS

| | | | | |
|---|---|---|---|---|
| 5,278,980 A | * | 1/1994 | Pedersen et al. | 1/1 |
| 6,026,388 A | * | 2/2000 | Liddy et al. | 1/1 |
| 6,871,174 B1 | * | 3/2005 | Dolan et al. | 704/9 |
| 7,013,264 B2 | * | 3/2006 | Dolan et al. | 704/9 |
| 2003/0191627 A1 | * | 10/2003 | Au | 704/9 |
| 2005/0065777 A1 | * | 3/2005 | Dolan et al. | 704/10 |
| 2005/0080780 A1 | * | 4/2005 | Colledge et al. | 707/4 |
| 2005/0108001 A1 | * | 5/2005 | Aarskog | 704/10 |
| 2005/0187920 A1 | * | 8/2005 | Tenembaum et al. | 707/3 |
| 2006/0235870 A1 | * | 10/2006 | Musgrove | 707/102 |

FOREIGN PATENT DOCUMENTS

| | | |
|---|---|---|
| JP | 2005128961 A | 5/2005 |
| WO | 9641333 A1 | 12/1996 |
| WO | 2005020091 A1 | 3/2005 |

OTHER PUBLICATIONS

International Search Report, International Application No. PCT/US2009/067261, dated Jul. 1, 2010.

* cited by examiner

*Primary Examiner* — Justin Rider
(74) *Attorney, Agent, or Firm* — Conley Rose, P.C.

(57) ABSTRACT

A machine-readable storage medium includes computer-executable instructions that, when executed by a processor, cause the processor to receive as input a target sentence comprising a target word and retrieve a gloss of the target word. The processor is further caused to parse the target sentence and the gloss. The processor is further caused to assign a score to the gloss based on the gloss's coherence to the target sentence.

19 Claims, 9 Drawing Sheets

Input: Glosses from WordNet;
$S$: the sentence to be disambiguated;
$G$: the knowledge base built in Section 2;
1. Input a sentence $S$, $W = \{w| w$ is either a noun, verb, adjective, or adverb, $w \in S\}$;
2. Parse $S$ with a dependency parser, generate parsing tree $T_S$;
3. For each $w \in W$ {
4. Input all $w$'s glosses from WordNet;
5. For each gloss $w_i$ {
6. Parse $w_i$, get a parsing tree $T_{wi}$;
7. $score1$ = TreeMatching($T_S$; $T_{wi}$);
8. $score2$ = GlossMatching($T_S$; $T_{wi}$);
}
9. The sense corresponding to the highest $score1$ is marked as $CandidateSense1$.
10. The sense corresponding to the highest $score2$ is marked as $CandidateSense2$.
11. If $CandidateSense1$ is equal to $CandidateSense2$, choose $CandidateSense1$;
12. Otherwise, choose the first sense.
}
TreeMatching($T_S$, $T_{wi}$)
13. For each node $n_{Si} \in T_S$ {
14. Assign weight $w_{Si} = 1/l_{Si}$, $l_{Si}$ is the length between $n_{Si}$ and $w_i$ in $T_S$;
}
15. For each node $n_{wi} \in T_{wi}$ {
16. Load its dependent words $D_{wi}$ from $G$;
17. Assign weight $w_{wi} = 1/l_{wi}$, $l_{wi}$ is the level number of $n_{wi}$ in $T_{wi}$;
18. For each $n_{Sj}$ {
19. If $n_{Sj} \in D_{wi}$
20. calculate connection strength $s_{ji}$ between $n_{Sj}$ and $n_{wi}$;
21. score = score + $w_{Si} \times w_{wi} \times s_{ji}$;
}
}
22. Return score;
GlossMatching($T_S$, $T_{wi}$)
23. For each node $n_{Si} \in T_S$ {
24. Assign weight $w_{Si} = 1/l_{Si}$, $l_{Si}$ is the length between $n_{Si}$ and $w_i$ in $T_S$;
}
25. For each node $n_{wi} \in T_{wi}$ {
26. Assign weight $w_{wi} = 1/l_{wi}$, $l_{wi}$ is the level number of $n_{wi}$ in $T_{wi}$;
27. For each $n_{Sj}$ {
28. If $n_{Sj} == w_{wi}$
29. score = score + $w_{Si} \times w_{wi}$;
}
}
30. Return score;

Figure 4A

```
Input:
G: the knowledge base
H: index of hypernyms/hyponyms of words in WordNet
TS: dependency tree of the sentence to be disambiguated
Twi: dependency tree of the words in gloss wi
TreeMatching3 (G, H, TS, Twi)
    For each node NTSi ∈ TS {
        Load its dependent words dTSi from G;
        Assign weight wTSi = 1/lTSi; //lTSi is the length between nTSi and wi in S
        For each node NTwi ∈ Twi {
        Load its hypernyms and hyponyms hTwi from H;
            Assign weight wTwi = 1/lTWi; //lTWi is the level number of NTwi in Twi
            For each word w ∈ hTwi {
                If Ntwi ∈ dTsi or w ∈ dTsi
                score = score + wTSi x wTwi;
                }
            }
        }
    Return score;
```

Figure 4B

Input:

G: the knowledge base

TS: dependency tree of the sentence to be disambiguated

Twi: dependency tree of the words in gloss wi

TreeMatching4 (G, TS, Twi)

For each node NTSi ∈ TS {

Assign weight wTSi = 1/lTSi;       //lTSi is the length between nTSi and wi in S For each node NTwi ∈ Twi {

Assign weight wTwi = 1/lTWi; //lTWi is the level number of NTwi in Twi

Calculate similarity score s for NTwi and NTSi;

If s > max_s max_s = s;

} score = score + max_s x wTSi x wTwi;

}

Return score;

Figure 4C

```
Input:
G: the knowledge base
TS: dependency tree of the sentence to be disambiguated
TreeMatching5 (G, TS)
    For combination n (1 ≤ n ≤ number of senses(NTS0) x number of senses(NTS1) x ... x
        number of senses(NTSi)), of all possible combination of senses of all nodes NTSi ∈ TS
    {
        Generate a dependency tree, Tgn whereby each NTSi is replaced by the dependency
                tree of the gloss of NTSi corresponding to n, the current
        combination of glosses;
        Assign weights to each node Ntgni ∈ Tgn, where each weight is calculated as the
                reciprocal of the level of Ntgni within its tree;
        For each node NTgni ∈ Tgn {
            Load its dependent words dNTgni from G;
            For each node NTgnj ∈ Tgn and ≠ NTgni {
                if NTgnj ∈ dNTgni
                score = score + edge weight(NTgni) x edge weight(NTgnj);
            }
        }
        Return score, the score for current combination of senses;
    }
```

Figure 4D

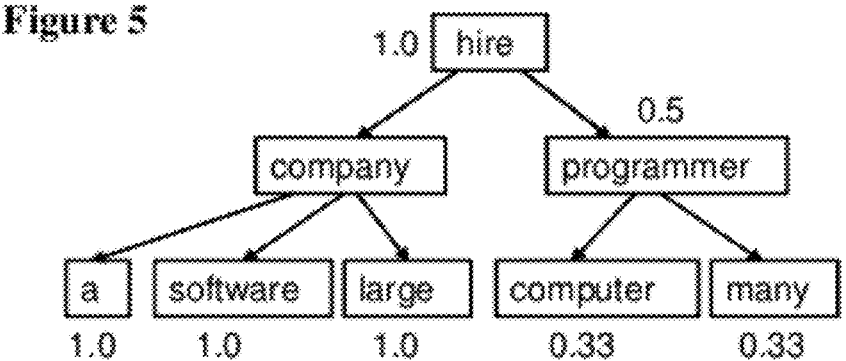
Figure 5
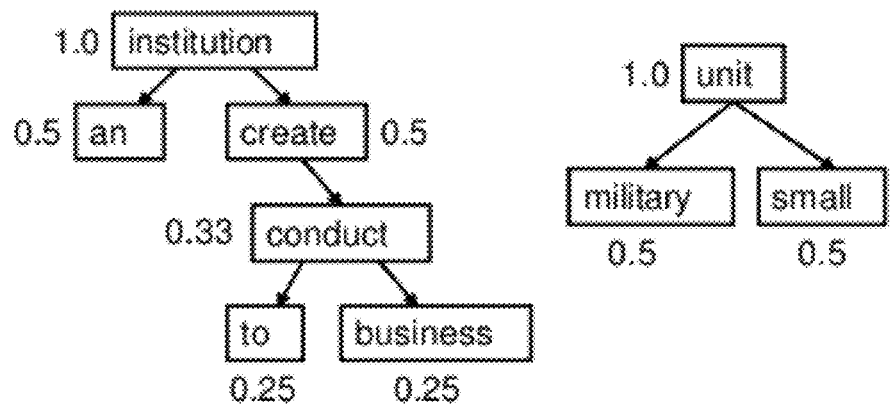
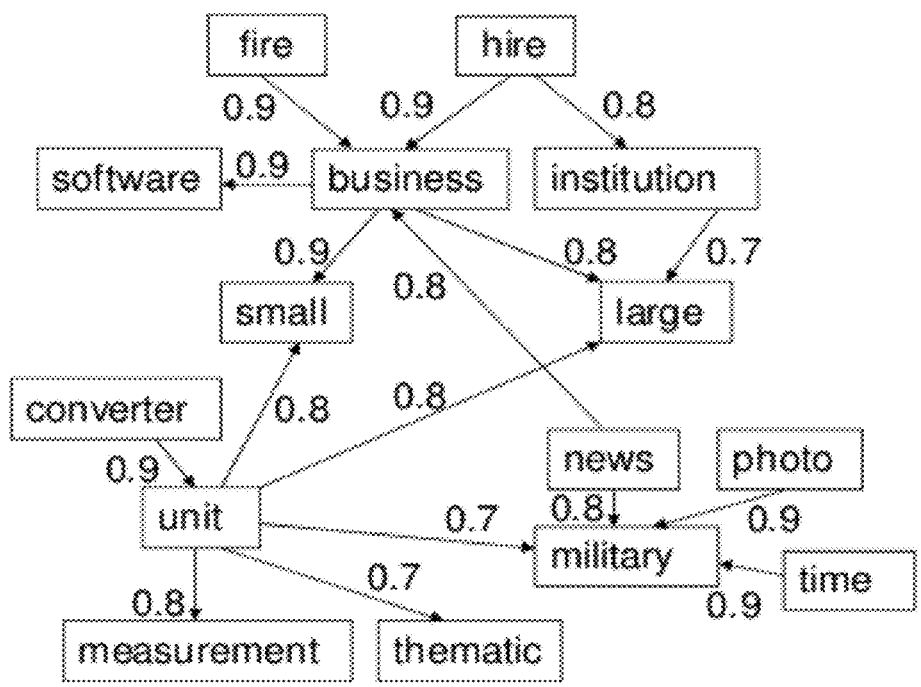
Figure 6

WORD SENSE DISAMBIGUATION

CROSS-REFERENCE TO RELATED APPLICATIONS

This application claims priority to U.S. Provisional Application Ser. No. 61/121,015 titled "Word Sense Disambiguation," filed Dec. 9, 2008, incorporated herein by reference.

BACKGROUND

As technology is increasingly necessary for more aspects of society, easing accessibility by lowering the technical and skill barrier for operation is vital. Humans use natural languages such as English and Spanish for communication and information processing. Technology does not. This divide is a major obstacle to lowering the technological barrier and is a long-standing problem in computational linguistics. One factor in this problem is the polysemy common in many natural languages, i.e., one word can have numerous senses. Word sense disambiguation (WSD) methods disambiguate a word's sense based on its context. How to choose a valid sense of a word with multiple senses based on context proves to be very difficult for technology even after twenty years of research in bridging the divide, but is routinely mastered by children. A solution to this problem will alter every intersection between humans and technology from a television remote to computer programming.

For example, when using Internet search engines, users input a few keywords that are used to form a query. Determining the senses of these keywords is essential for the quality of retrieved documents. Any mismatch between expectations and results is typically an error attributed to the user. As such, a kind of art form has developed from the ability to divine meaningful search terms. This requirement of skill is a barrier preventing adoption of technology. Considering other scenarios where technology must understand the sense of a word, in machine translation, before a sentence or phrase can be translated from one natural language to another language the machine translator needs to understand the senses of each word. Even a simple machine proofreader is likely to overlook errors of polysemy. As such, the importance of word sense disambiguation ("WSD") cannot be overemphasized.

BRIEF SUMMARY

Word sense disambiguation is disclosed. In at least one embodiment, a machine-readable storage medium includes computer-executable instructions that, when executed by a processor, cause the processor to receive as input a target sentence comprising a target word, and retrieve a gloss of the target word. The processor is further caused to parse the target sentence and the gloss, and assign a score to the gloss based on the gloss's coherence to the target sentence.

In at least another embodiment, a method includes receiving as input a target sentence including a target word, and retrieving a gloss of the target word. The method further includes parsing the target sentence and the gloss, and assigning a score to the gloss based on the gloss's coherence to the target sentence.

In yet another embodiment, a machine-readable storage medium includes computer-executable instructions that, when executed by a processor, cause the processor to receive as input a target word. The processor is further caused to input the target word into a filter and to parse sentences containing the target word from websites returned by the filter. The processor is further caused to merge the parsed sentences.

As such, a fully automatic unsupervised WSD system is disclosed. The foregoing has identified the features of several embodiments in order that the detailed description that follows may be better understood. It should be appreciated by those skilled in the art that the conception and the specific embodiments disclosed may be readily utilized as a basis for modifying or designing other structures for carrying out the same purposes of the disclosure. It should also be realized by those skilled in the art that such equivalent constructions do not depart from the spirit and scope of the disclosure as set forth in the appended claims.

BRIEF DESCRIPTION OF THE DRAWINGS

Reference will now be made to the accompanying drawings in which:

FIGS. 4A-4D illustrate varying ways to assign scores in at least some illustrative embodiments;

FIG. 5 illustrates parsing in at least one illustrative embodiment;

FIG. 6 illustrates a graphical representation of a portion of the database in at least one illustrative embodiment.

NOTATION AND NOMENCLATURE

Figure 1:
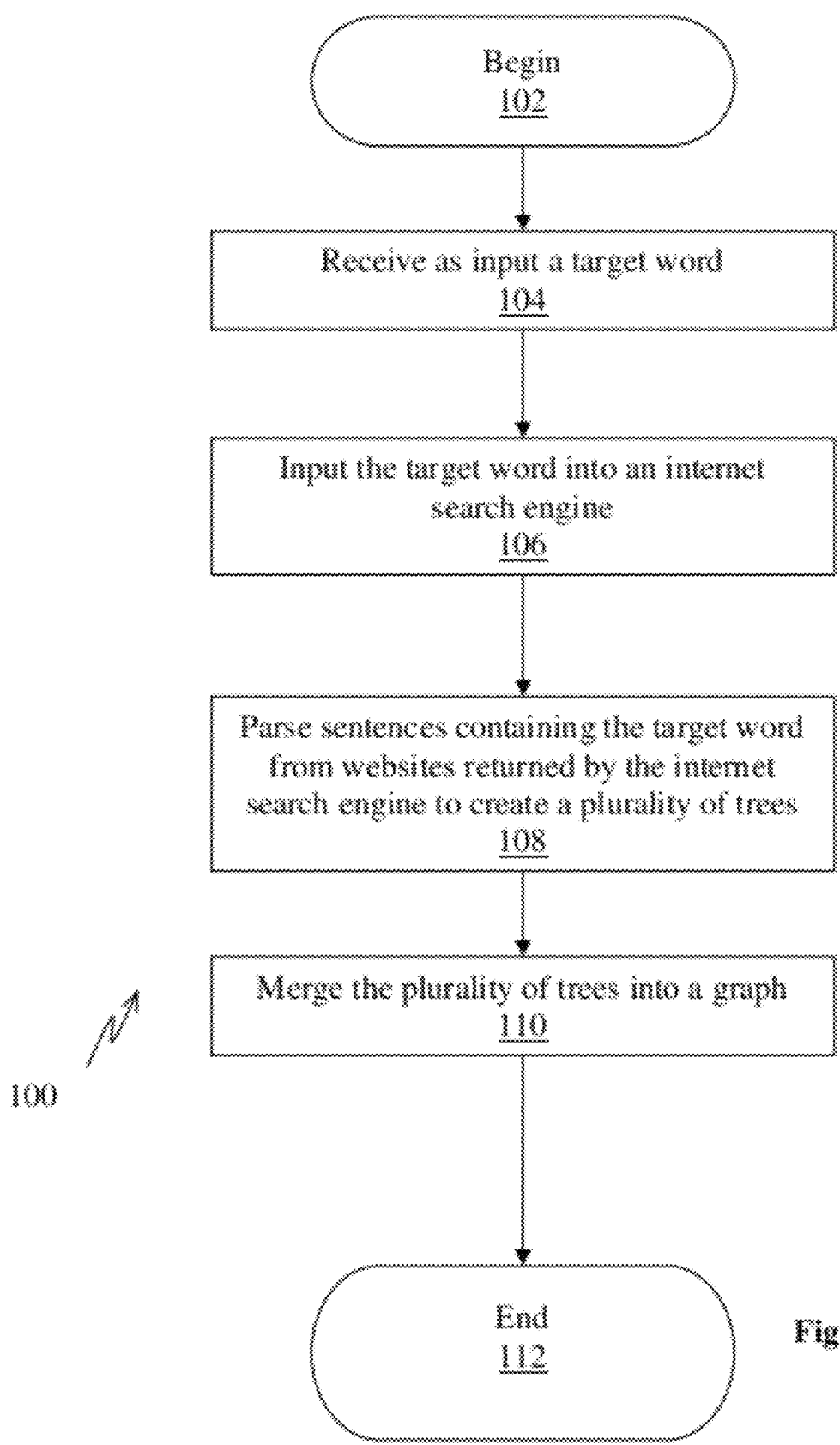
FIG. 1 illustrates creation of a database used in WSD in at least one illustrative embodiment.

In the following discussion and in the claims, the terms "including" and "comprising" are used in an open-ended fashion, and thus should be interpreted to mean "including, but not limited to . . . ." Also, the term "couple" or "couples" is intended to mean an optical, wireless, indirect, or direct connection. Thus, if a first device couples to a second device, that connection may be through an indirect connection via other devices and connections, through a direct optical connection, etc.

DETAILED DESCRIPTION OF THE PREFERRED EMBODIMENTS

The following discussion is directed to various embodiments. Although one or more of these embodiments may be preferred, the embodiments disclosed should not be interpreted, or otherwise used, as limiting the scope of the disclosure, including the claims. In addition, one having ordinary skill in the art will understand that the following description has broad application, the discussion of any embodiment is meant only to be exemplary of that embodiment, and the discussion of an embodiment is not intended to intimate that the scope of the disclosure, including the claims, is limited to that embodiment.

Some WSD methods use the "context" of a word for its sense disambiguation. For example, if a word to be disambiguated is called a target word in a target sentence, using context means using the non target words in the target sentence to help identify the sense intended for the target word. In at least some embodiments, instead of using only context, the "coherence" of a gloss of the target word is used. Coherence is the measure of the gloss's semantic fit within the target sentence. If the coherence of all glosses of a target word are measured and assigned a score, the gloss with the highest coherence score is the correct sense of the target word.

For example, the target word "bank" in English has the following senses:

Noun
1. bank (sloping land (especially the slope beside a body of water))
2. depository financial institution, bank, banking concern, banking company (a financial institution that accepts deposits and channels the money into lending activities)
3. bank (a long ridge or pile) "a huge bank of earth"
4. bank (an arrangement of similar objects in a row or in tiers)
5. bank (a supply or stock held in reserve for future use (especially in emergencies))
6. bank (the funds held by a gambling house or the dealer in some gambling games)
7. bank, cant, camber (a slope in the turn of a road or track; the outside is higher than the inside in order to reduce the effects of centrifugal force)
8. savings bank, coin bank, money box, bank (a container (usually with a slot in the top) for keeping money at home) "the coin bank was empty"
9. bank, bank building (a building in which the business of banking transacted)
10. bank (a flight maneuver; aircraft tips laterally about its longitudinal axis)

Verb
11. bank (tip laterally)
12. bank (enclose with a bank) "bank roads"
13. bank (do business with a bank or keep an account at a bank)
14. bank (act as the banker in a game or in gambling)
15. bank (be in the banking business)
16. deposit, bank (put into a bank account) "She deposits her paycheck every month"
17. bank (cover with ashes so to control the rate of burning) "bank a fire"
18. trust, swear, rely, bank (have confidence or faith in)

Suppose there are 4 target sentences containing the word "bank":

A. He operated a bank of switches.
B. The plane went into a steep bank.
C. The pilot had to bank the aircraft.
D. Bank on your good education.

A WSD algorithm should select sense 4 for target sentence A; 10 for B; 11 for C; and 18 for D. Considering target sentence A, glosses 11-18 can be eliminated based on comparison of the part of speech of the target word and the sense. The target word is used as a noun, therefore the senses where "bank" is used as verb can be eliminated. Next, coherence is measured for the glosses of each sense 1-10. The highest score of coherence measured should stem from sense 4. In order to automate these steps such that they may be performed unsupervised, some information about words in general should be obtained. For example, in order to eliminate senses stemming from an incompatible part of speech, a WSD algorithm should detect the part of speech of the target word as used in the target sentence and detect the part of speech used in each sense. As another more basic example, the list of senses should be complete and the gloss of each sense should be available. A database is one way to structure such information.

FIG. 1 illustrates a method 100 of database creation beginning at 102 and ending at 112. The database preferably houses a robust set of information about words such that a WSD algorithm that references the database can be quickly executed. As such, the database should be created using many semantically valid sample sentences containing potential target words. Preferably, the database creation is unsupervised as well; this allows for every word in the target language to be a potential target word. Additionally, the sample sentences should be semantically diverse and cover different senses of these words. At 104, a target word is received as input. For example, the word "programmer" is received as the target word for purposes of database creation, i.e., the next word to add to the database.

One way to aggregate sample sentences without supervision is to use the Internet. Millions of web pages and billions of documents are accessible using the Internet. The major concern about these sources is their semantic quality. Factual errors ("President Lincoln was born in 1967.") will not hurt semantic quality. Rather, broken sentences using poor diction, grammar, and spelling will hurt semantic quality. As such, a filter should be used. In at least one embodiment, the filter is one or more Internet search engines. At 106, the target word is input into an Internet search engine. For example, the word "programmer" is submitted to search engines provided by Google, Yahoo, Microsoft, etc. The impact of poor semantic quality is further minimized via the process of "merging" discussed below.

In at least one embodiment, only the first 1,000 hits of a search engine are used. First, sentences in the first 1,000 hits containing the target word are collected. The collected text is cleaned, e.g., control characters and html tags are removed. Next, sentences are segmented based on punctuation. At 108, the sentences are parsed. For ease of discussion, consider only two sentences returned by the filter using the word "programmer" as the target word: "Computer programmers write software." and "Many companies hire computer programmers." Plural words are preferably reduced to their singular form during parsing, but in at least one embodiment, plural words constitute separate words apart from their singular form. Also, only nouns, verbs, adjectives, and adverbs survive parsing in at least one embodiment.

Figure 2:
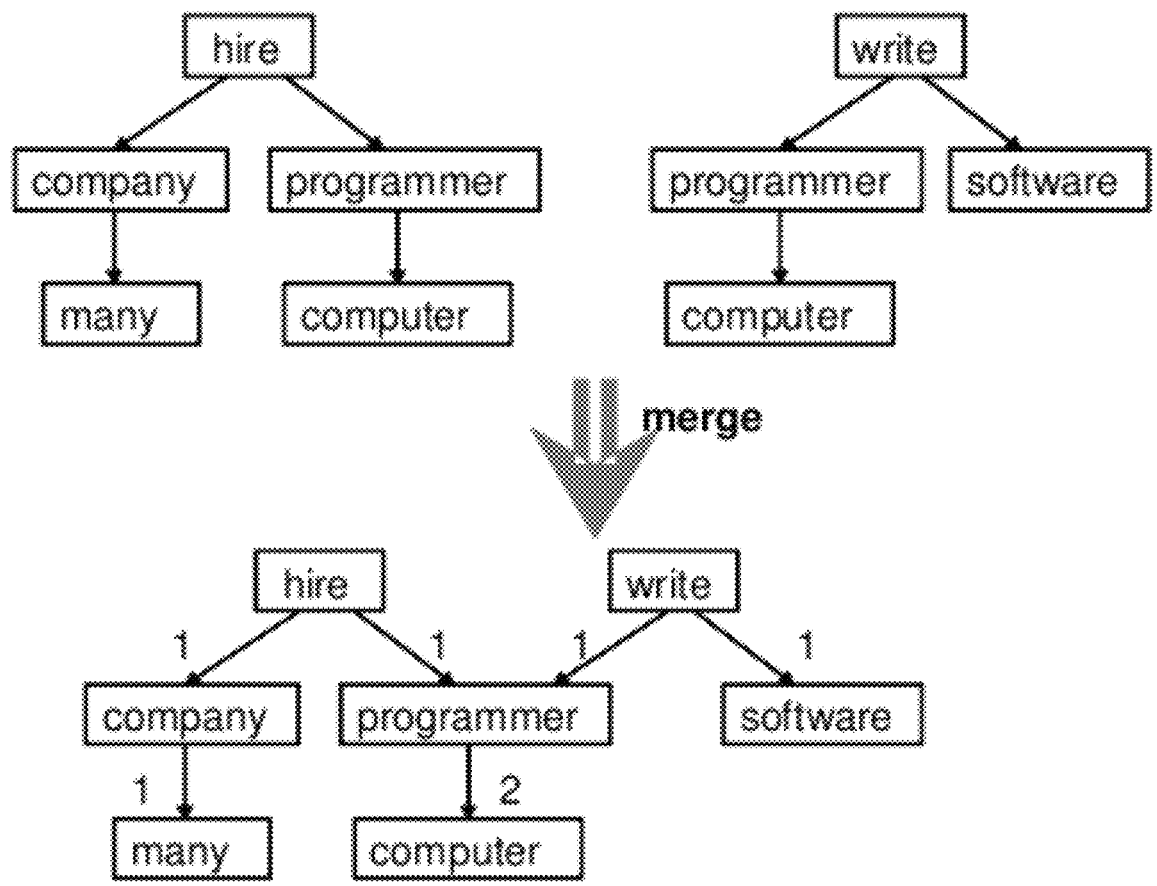
FIG. 2 illustrates sentence parsing and merging in at least one illustrative embodiment.

When parsed, the dependency relationships in the two sentences can be illustrated as depicted in the top of FIG. 2. One dependency relation includes two words/nodes, one head word/node and one dependent word/node. In a dependency relation illustrated as "word1→word2," word1 is the head word, and word2 is the dependent word. For example, FIG. 2 illustrates "hire→company," which represents that "company" is dependent upon "hire" in the target sentence. One tree is used to illustrate each parsed sentence. Each word is a node in the tree, and each dependency relationship is a directed edge in the tree.

At 110, the plurality of trees are merged into a graph, i.e., the parsed sentences are merged based on the dependency relationships. Merging the plurality of trees comprises assigning a weight to a dependency between nodes of the tree based on frequency of occurrence of the dependency. For example, "programmer→computer" occurs twice, and is given a weight of two. This is represented visually by combining the trees as depicted at the bottom of FIG. 2.

Merging the parsed sentences results in a graph with words as nodes and dependency relations as edges. In at least one embodiment, only exact matches are used. In other embodiment, merely similar dependency relationships result in merger. After merging dependency relations, a weighted graph associated with the target word is obtained with words as nodes, dependency relationships as edges, and number of occurrences as weights of the edges. As an unsupervised process, erroneous dependency relations in the database may occur. However, because valid dependency relations tend to occur far more times than invalid ones in filtered collection, these erroneous edges only have minimal impact on the disambiguation quality because they are assigned minimal weights.

Although absolute frequency of a dependency relation obtained after merging can reflect the semantic relatedness of head word and dependent word to a certain degree, this direct measure is inevitably distorted by the frequencies of head word and dependent word. Dependency weights are normalized between nodes of a tree by calculating a connection strength of the dependency in at least one embodiment. If the connection strength is below a threshold, the dependency weights are normalized to 0. For example, suppose that both "wine→red" and "Merlot→red" occur 5 times in the database. This indicates that the connection strength between these two pairs of words is equal. However, "Merlot→red" should have a stronger connection because "wine," as an individual word, is a more common word than "Merlot" and occurs more frequently in the database. An intuitive, and perhaps imprecise, rationale for desiring a stronger connection is that Merlot (the wine) and Merlot (the grape) are usually always considered "red," but wine is not usually always considered red. One way to incorporate the idea that "Merlot→red" should have a stronger connection is to use the $\chi^2$ test to normalize occurrence frequency to a value within [0, 1]. The test is efficient to check whether two random variables X and Y are independent by large samples.

Let $n_{ij}$ denote the number of occurrences when $(X, Y)=(x_i; y_j)$, where i, j=1, 2. The $\chi^2$ values can be calculated with the following contingency table:

TABLE 1

| Contingency table | | | |
|---|---|---|---|
| Y/X | w | ¬w | marginal distribution of X |
| w | n11 | n12 | n1. |
| w' | n21 | n22 | n2. |
| marginal distribution of Y | n.1 | n.2 | N |

From the null hypothesis $H_0$: P(X|Y)=P(X):

$$X^2 = \frac{N(n_{11}n_{22} - n_{12}n_{21})^2}{n_1.n_2.n_{.1}n_{.2}} \sim X^2(1)$$

For example,

TABLE 2

| Y = X | red | ¬red | total |
|---|---|---|---|
| wine | 5 | 1258 | 1263 |
| ¬wine | 2434 | 768954 | 771388 |
| total | 2439 | 770212 | 772651 |

$$X^2 = \frac{772651 \times (5 \times 768954 - 1258 \times 2434)^2}{1263 \times 771388 \times 2439 \times 770212} = 0.259$$

Given $\alpha=0.85$, $X^2_\alpha(1)=0.036$, since $X^2 \gg X^2_\alpha(1)$, the connection strength of "wine→red" is (1−0.85)=0.15.

$$X^2 = \frac{772651 \times (5 \times 770087 - 125 \times 2434)^2}{130 \times 772521 \times 2439 \times 770212} = 223.722$$

Given $\alpha=0.001$, $X^2_\alpha(1)=10.83$, since $X^2 \gg X^2_\alpha(1)$, the connection strength of "Merlot→red" is (1−0.001)=0.999.

TABLE 3

| Y = X | red | ¬red | total |
|---|---|---|---|
| Merlot | 5 | 125 | 130 |
| ¬Merlot | 2434 | 770087 | 772521 |
| total | 2439 | 770212 | 772651 |

The process is repeated for each target word, resulting in an equal number of graphs. The graphs for each word are merged in the same way to create the database. The database receives as input a target word, and provides a gloss of the target word based on the database as described below.

Figure 3:
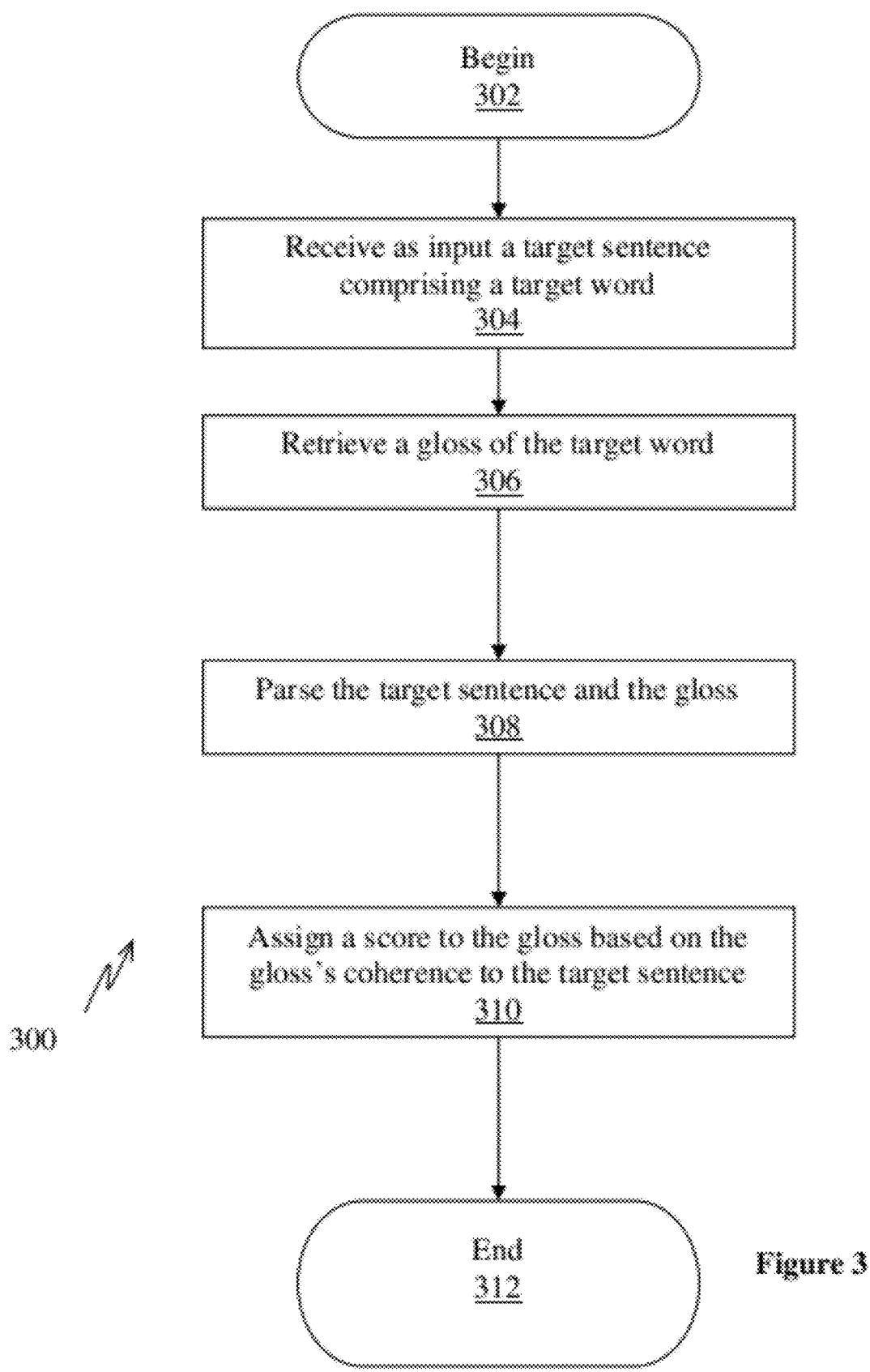
FIG. 3 a method of WSD in at least one illustrative embodiment.

FIG. 3 illustrates a method 300 of word sense disambiguation beginning at 302 and ending at 312. At 304, a target sentence comprising a target word is received as input. For example, the target word is "company," and the target sentence is "A large company needs a sustainable business model." At 306, a gloss of the target word is retrieved. The gloss is preferably retrieved from the database, and the database preferably encompasses information in WordNet (an open source dictionary).

Preferably, the database is created before WSD algorithms begin to reference the database. However, in at least one embodiment, database creation or addendum is performed "on-the-fly." For example, when a target word, for purposes of gloss retrieval, is not in the database, the target word is submitted as the target word for purposes of database addendum using the process described above. If the WSD algorithm is executed on a device connected to the Internet, on-the-fly creation or addendum can be practical.

Portions of the method 300 can be repeated serially for each gloss or in parallel. For ease of discussion, assume only two glosses are available. The first gloss is "an institution created to conduct business," and the second gloss is "a small military unit."

At 308, the target sentence and the glosses are parsed, shown in illustrative form as trees in FIG. 5. Preferably, parsing the target sentence comprises weighting a dependency between words of the target sentence based on the non target words' distance from the target word. As illustrated, the dependency relationships are weighted based on their distance from the target word "company." For example, in the parsing tree of the target sentence, the weight of a relationship is the reciprocal of the distance between this node and the target word "company." In the parsing tree of the glosses, the weight of a node is reciprocal of the level of the node in the parsing tree. In at least one embodiment, parsing the gloss comprises weighting a dependency between words of the gloss based on the words' distance from a head word, or root word, of the gloss.

At 310, a score is determined and assigned to the gloss based on the gloss's coherence to the target sentence. Coherency scores can be determined and assigned in many ways. FIGS. 4A-4D illustrate ways coherency scores may be determined and assigned.

Considering FIG. 4A, assigning the score comprises determining a first set comprising elements of the target sentence that are dependent on the target word. For example, the elements of the first set are "large" and "a." A second set is determined comprising words of the database that are also elements of the gloss and have as a dependent word, within the database, an element of the first set (corresponding to line 15, 16 in FIG. 4A). For example, FIG. 6 illustrates a small portion of the database. Words of the database that are also elements of the gloss are "institution," "business," "military," "unit," and "small." However, only "institution" and "business" have an element of the first set as a dependent word: "large." Next, a score is assigned based on dependency weights corresponding with elements of the second set (corresponding to line 20, 21 in FIG. 4A). Score1 of gloss1, based on dependencies, is determined as: $1.0 \times 1.0 \times 0.7 + 1.0 \times 0.25 \times 0.8 = 0.9$ corresponding to (weight of dependency relation "company→large")×(weight of the node "institution")×(weight of dependency relation "institution→large")+(weight of dependency relation "company→large")×(weight of the node "business")×(weight of dependency relation "business→large")=score 1. Score2 of gloss1 is generated based on the overlapping words between the target sentence and gloss1. For example, there is only one overlapping word: "business." As such, score2 of gloss1 is (corresponding to line 28, 29 in FIG. 4A) $0.33 \times 0.25 = 0.0825$ corresponding to (weight of "business" dependency in parsed target sentence)×(weight of "business" node in parsed gloss)=score2.

This process is repeated with all glosses. For example, the process is repeated with the second gloss "small military unit." Score1 of gloss 2 is: $1.0 \times 1.0 \times 0.8 = 0.8$, and score2 of gloss2 is 0 (no overlapping words). Comparing score1 of gloss1 and score1 of gloss2, i.e. comparing TreeMatching scores, indicates gloss1 should be selected because 0.9>0.8. Comparing score2 of gloss1 and score2 of gloss2, i.e. comparing GlossMatching scores, confirms that gloss1 should be selected because 0.0825>0. As such, the sense corresponding to gloss one of "company" is selected as the correct sense. In at least one embodiment, if TreeMatching and GlossMatching suggest different glosses should be selected, the most frequently occurring gloss will be selected (corresponding to line 12 in FIG. 4A). In at least some embodiments, only TreeMatching or only GlossMatching scores are determined and used to select the correct sense.

A target word may have no dependent words. As such, head words, on which the target word is dependent, are used in at least one embodiment. For example, "need" (the head word of "company") is used. Using the dependency relation "need→company," sense 1 is correctly selected because there is no relationship "need→unit" in the database. This strategy is also helpful when disambiguating adjectives and adverbs because those parts of speech usually only depend on other words, and rarely are any other words dependent on them.

FIG. 4B illustrates an embodiment where hypernyms and hyponyms are used. A hypernym of a target word is a word that includes the target word and all the target word's referents in its own set of referents. A hypernym of a target word is sometimes called a superordinate, superclass, or superset of the target word. For example, "dog" is a hypernym of "Labrador," "Collie," and "Chihuahua." A hyponym of a target word is a word that is included in the target word's referents, and all the hyponym's referents are included in the target word's referents. A hyponym of a target word is sometimes called a subordinate, subclass, or subset of the target word. For example, "dog" is a hyponym of "animal." Hypernyms and hyponyms can be incorporated into the database through WordNet. During TreeMatching, a first set comprising hypernyms or hyponyms of elements of the target sentence that are dependent on the target word is determined. A second set comprising words of a database that are also elements of the gloss and have as a dependent word, within the database, an element of the first set is determined. The score is assigned based on dependency weights corresponding with elements of the second set.

Instead of hypernyms and hyponyms, synonyms are similarly used in at least one embodiment. Synonyms can be incorporated into the database through WordNet.

FIG. 4C illustrates use of similarity scores in at least one embodiment. Instead of using exact matches to assign scores for overlapping nodes, scores are assigned to similar matches. For example, if one of the gloss, target sentence, or database contained the word "river" while another one of the gloss, target sentence, or database contained the word "water," TreeMatching would still proceed despite "river" not being an exact match, synonym, hypernym, or hyponym of "water." The weight assigned can be incorporated into the database.

FIG. 4D illustrates use of combination of glosses with combinations of words. For example, consider a target sentence of 7 words {word1, word2, . . . , word7}. Word1 is the target word. Word1 has four glosses available. In an embodiment already described, the four glosses would be measured for coherence in the target sentence. That is {gloss1 of Word1, word2, . . . , word7} would be measured, {gloss2 of Word1, word2, . . . , word7} would be measured, etc. In this embodiment, the different glosses for word1 are measured against different glosses for non-target words. For example, suppose only word3 and word7 have multiple glosses except Word1. Word3 has 2 glosses, and word7 has 3 glosses. First {gloss1 of Word1, word2, gloss1 of Word3, word4, . . . , gloss1 of Word7} would be measured. Next, {gloss1 of Word1, word2, gloss2 of Word3, word4, . . . , gloss1 of Word7} would be measured. Next, {gloss1 of Word1, word2, gloss1 of Word3, word4, . . . , gloss2 of Word7} would be measured. In this way, all 24 combinations would be measured.

Figure 7:
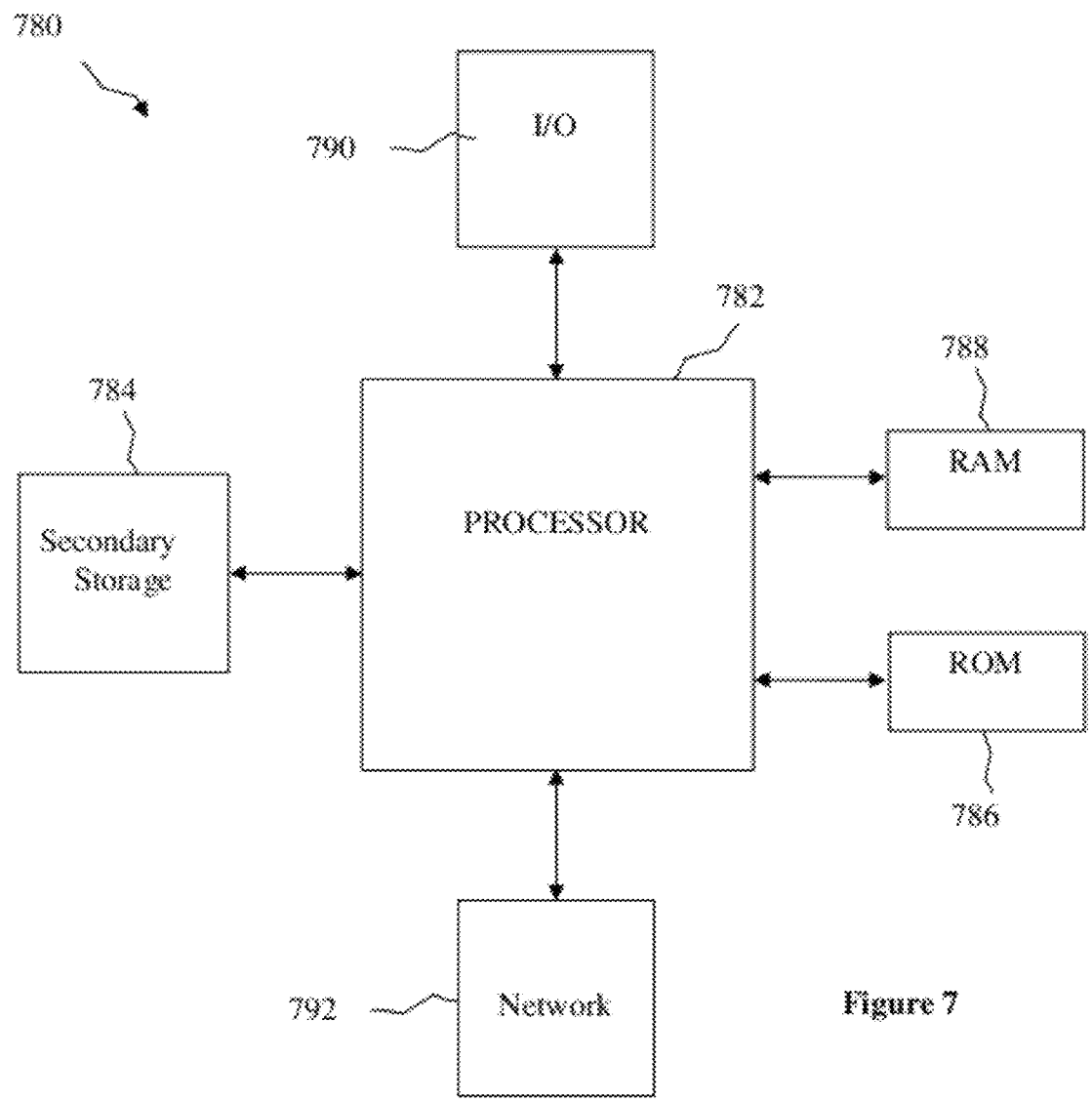
FIG. 7 illustrates a system suitable for implementing one or more embodiments described herein.

The system described above may be implemented on any particular machine with sufficient processing power, memory resources, and network throughput capability to handle the necessary workload placed upon it. FIG. 7 illustrates a system 780 suitable for implementing one or more embodiments disclosed herein. The system 780 includes a processor 782 (which may be referred to as a central processor unit or CPU) that is in communication with memory devices including secondary storage 784, read only memory (ROM) 786, random access memory (RAM) 788, input/output (I/O) 790 devices, and network connectivity devices 792. The processor may be implemented as one or more CPU chips.

The secondary storage 784 is typically comprised of one or more disk drives or tape drives and is used for non-volatile storage of data and as an over-flow data storage device if RAM 788 is not large enough to hold all working data. Secondary storage 784 may be used to store programs, which are loaded into RAM 788 when such programs are selected for execution. The ROM 786 is used to store instructions and perhaps data, which are read during program execution. The ROM 786 is preferably a machine-readable storage medium storing software or instructions that, when executed by one or more processors 782, causes the processor 782 to perform any of the steps described in this disclosure. ROM 786 is a non-volatile memory device that typically has a small memory capacity relative to the larger memory capacity of secondary storage. The RAM 788 is used to store volatile data and perhaps to store instructions. Access to both ROM 786 and RAM 788 is typically faster than to secondary storage 784.

I/O 790 devices may include printers, video monitors, liquid crystal displays (LCDs), touch screen displays, keyboards, keypads, switches, dials, mice, track balls, voice recognizers, card readers, paper tape readers, or other well-known input devices. The network connectivity devices 792 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 792 devices may enable the processor 782 to communicate with an Internet or one or more intranets. With such a network connection, it is contemplated that the processor 782 might receive information from the network, or might output information to the network in the course of performing the above-described method steps. Such information, which is often represented as a sequence of instructions to be executed using processor 782, may be received from and outputted to the network, for example, in the form of a computer data signal embodied in a carrier wave.

Such information, which may include data or instructions to be executed using processor 782 for example, may be received from and outputted to the network, for example, in the form of a computer data baseband signal or signal embodied in a carrier wave. The baseband signal or signal embodied in the carrier wave generated by the network connectivity 792 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods.

The processor 782 executes instructions, codes, computer programs, scripts which it accesses from hard disk, floppy disk, optical disk (these various disk based systems may all be considered secondary storage 784), ROM 786, RAM 788, or the network connectivity devices 792.

Because the preceding word sense disambiguation is unsupervised, it can be performed cheaply, it is scalable, and it is useful in a wide variety of applications. Moreover, word usage is not a static phenomenon. New usage of words emerge, which creates new senses. New words are created, and some words may "die" over time, which makes supervision even more impractical. The preceding WSD algorithms acquire coherence information directly from widely available sources, with a minimum amount of noise. Additionally, because of coherence, the scope of this disclosure is not limited to the English language. The same techniques can be used in other languages as long as glosses of the target word representative of the intended sense cohere to the target sentence.

The above disclosure is meant to be illustrative of various embodiments. Numerous variations and modifications will become apparent to those skilled in the art once the above disclosure is fully appreciated. Also, the order of the actions shown in any figure can be varied from order shown, and two or more of the actions may be performed concurrently. It is intended that the following claims be interpreted to embrace all variations and modifications.

While the preferred embodiments have been shown and described, modifications thereof can be made by one skilled in the art without departing from the spirit and teachings of the disclosure. The embodiments described and the examples provided herein are exemplary only, and are not intended to be limiting. Many variations and modifications are possible and are within the scope of the disclosure. Accordingly, the scope of protection is not limited by the description set out above, but is only limited by the claims that follow, that scope including all equivalents of the subject matter of the claims.

We claim:

1. A non-transitory machine-readable storage medium comprising computer-executable instructions that, when executed by a processor, cause the processor to:
    receive as input a target sentence comprising a target word;
    retrieve a gloss of the target word;
    parse the target sentence and the gloss; and
    assign a score to the gloss based on the gloss's coherence to the target sentence, wherein assigning the score comprises
    assigning a first score to the gloss based on dependency weights of the gloss and a database;
    assigning a second score to the gloss based on dependency weights of the gloss and the target sentence;
    assigning a third score to a second gloss based on dependency weights of the second gloss and the database;
    assigning a fourth score to the second gloss based on dependency weights of the second gloss and the target sentence;
    if the first score is higher than the third score, and the second score is higher than the fourth score, then selecting the gloss; and
    if the third score is higher than the first score, and the fourth score is higher than the second score, then selecting the second gloss.

2. The storage medium of claim 1, wherein parsing the target sentence comprises weighting a dependency between words of the target sentence based on the words' distance from the target word.

3. The storage medium of claim 1, wherein parsing the gloss comprises weighting a dependency between words of the gloss based on the words' distance from a root word of the gloss.

4. The storage medium of claim 1, wherein assigning the score comprises
    determining a first set comprising elements of the target sentence that are dependent on the target word;
    determining a second set comprising words of a database that are also elements of the gloss and have as a dependent word, within the database, an element of the first set; and
    assigning the score based on dependency weights corresponding with elements of the second set.

5. The storage medium of claim 1, wherein assigning the score comprises
    determining a first set comprising elements of the target sentence that are also elements of the gloss; and
    assigning the score based on dependency weights corresponding with elements of the first set.

6. The storage medium of claim 1, wherein assigning the score comprises
    determining a first set comprising elements of the target sentence from which the target word depends;
    determining a second set comprising words of a database that are also elements of the gloss and have as a dependent word, within the database, an element of the first set; and
    assigning the score based on dependency weights corresponding with elements of the second set.

7. The storage medium of claim 1, wherein assigning the score comprises determining a first set comprising synonyms of elements of the target sentence that are dependent on the target word;

determining a second set comprising words of a database that are also elements of the gloss and have as a dependent word, within the database, an element of the first set; and assigning the score based on dependency weights corresponding with elements of the second set.

8. The storage medium of claim 1, wherein assigning the score comprises determining a first set comprising hypernyms or hyponyms of elements of the target sentence that are dependent on the target word;

determining a second set comprising words of a database that are also elements of the gloss and have as a dependent word, within the database, an element of the first set; and assigning the score based on dependency weights corresponding with elements of the second set.

9. A method, comprising:

a processor, that when executed, accesses a non-transitory machine-readable storage medium comprising computer-executable instructions to perform the steps:

receiving as input a target sentence comprising a target word;

retrieving a gloss of the target word;

parsing the target sentence and the gloss; and assigning a score to the gloss based on the gloss's coherence to the target sentence, and wherein assigning the score comprises:

determining a first set comprising elements and synonyms of elements of the target sentence that are dependent on the target word;

determining a second set comprising words of a database that are also elements of the gloss and have as a dependent word, within the database, an element of the first set; and assigning the score based on dependency weights corresponding with elements of the second set.

10. The method claim 9, wherein assigning the score comprises determining a first set comprising elements of the target sentence that are also elements of the gloss; and assigning the score based dependency weights corresponding with elements of the first set.

11. The method claim 9, wherein assigning the score comprises determining a first set comprising hypernyms or hyponyms of elements of the target sentence that are dependent on the target word;

determining a second set comprising words of a database that are also elements of the gloss and have as a dependent word, within the database, an element of the first set; and assigning the score based on dependency weights corresponding with elements of the second set.

12. A non-transitory machine-readable storage medium comprising computer-executable instructions that, when executed by a processor, cause the processor to:

receive as input a target word;

input the target word into a filter;

parse sentences containing the target word from websites returned by the filter;

merge the parsed sentences; and create a database, wherein creating a database comprises merging the merged parsed sentences with a second set of merged parsed sentences created using a second target word.

13. The storage medium of claim 12, wherein merging the parsed sentences comprises assigning a weight to a dependency between words of the parsed sentences based on frequency of occurrence of the dependency across the parsed sentences.

14. The storage medium of claim 12, wherein merging the parsed sentences comprises normalizing a dependency weight between words of the parsed sentences by calculating a connection strength of the dependency.

15. The storage medium of claim 12, wherein the filter is an Internet search engine.

16. The storage medium of claim 12, further causing the processor to receive as input a target word; and provide a gloss of the target word based on the database.

17. A non-transitory machine-readable storage medium comprising computer-executable instructions that, when executed by a processor, cause the processor to:

receive as input a target sentence comprising a target word;

retrieve a gloss of the target word;

parse the target sentence and the gloss; and assign a score to the gloss based on the gloss's coherence to the target sentence, wherein assigning the score comprises determining a first set comprising elements of the target sentence from which the target word depends;

determining a second set comprising words of a database that are also elements of the gloss and have as a dependent word, within the database, an element of the first set; and assigning the score based on dependency weights corresponding with elements of the second set.

18. A non-transitory machine-readable storage medium comprising computer-executable instructions that, when executed by a processor, cause the processor to:

receive as input a target sentence comprising a target word;

retrieve a gloss of the target word;

parse the target sentence and the gloss; and assign a score to the gloss based on the gloss's coherence to the target sentence, wherein assigning the score comprises determining a first set comprising synonyms of elements of the target sentence that are dependent on the target word;

determining a second set comprising words of a database that are also elements of the gloss and have as a dependent word, within the database, an element of the first set; and assigning the score based on dependency weights corresponding with elements of the second set.

19. A non-transitory machine-readable storage medium comprising computer-executable instructions that, when executed by a processor, cause the processor to:

receive as input a target sentence comprising a target word;

retrieve a gloss of the target word;

parse the target sentence and the gloss; and assign a score to the gloss based on the gloss's coherence to the target sentence, wherein assigning the score comprises determining a first set comprising hypernyms or hyponyms of elements of the target sentence that are dependent on the target word;

determining a second set comprising words of a database that are also elements of the gloss and have as a dependent word, within the database, an element of the first set; and assigning the score based on dependency weights corresponding with elements of the second set.

* * * * *